March 12, 1940.  W. A. DE VELLIER  2,193,477
SCREW
Filed Nov. 15, 1938   2 Sheets-Sheet 1

WILLIAM A. DE VELLIER
INVENTOR

BY Thomas A. Jenckes
ATTORNEY

March 12, 1940.   W. A. DE VELLIER   2,193,477
SCREW
Filed Nov. 15, 1938   2 Sheets-Sheet 2

WILLIAM A. DeVELLIER
INVENTOR

BY Thomas A. Jenckes
ATTORNEY

Patented Mar. 12, 1940

2,193,477

UNITED STATES PATENT OFFICE 2,193,477

SCREW

William A. De Vellier, Newark, N. J.

Application November 15, 1938, Serial No. 240,506

3 Claims. (Cl. 85—45)

My invention relates to improvements in screws, particularly to the heads of screws.

An object of my invention is to provide a screw provided with a recess of a shape capable of receiving a flat screw driver and permitting positive driving action thereby, or alternatively, a multisided screw driver for a more powerful torque, as is often desirable with power actuated screw drivers, which enable a multiplicity of screws to be positively embedded in a minimum amount of time.

I have discovered that if such a recess be constructed of diamond shape, with standard acute angles at each end and obtuse angles in the middle, between the side walls thereof, truncated at each acute angle end thereof, that a flat screw driver may be inserted within said recess to have the side walls thereof abut the side walls of said recess adjacent the acute angle end portions thereof for turning purposes, or a multisided hexagonal tip of a power actuated screw driver of cooperating shape may be inserted within said recess to have four walls thereof abut portions of the side walls of said diamond shaped recess, specifically the portions thereof adjacent the obtuse angle center portions thereof for turning purposes.

I also believe I am the first to provide a screw driver having an hexagonally shaped tip of a type to cooperate with a diamond shaped recess to turn a screw.

I also believe I am the first to provide a hexagonal recess with two opposite end walls thereof supplementally provided with longitudinal slits to permit the alternate insertion of a flat screw driver within said slits as well as a hexagonal screw driver within the hexagonal recess for turning purposes.

A further object of my invention is to provide a screw provided with a recessed head which may be readily stamped out in a simple punching operation. It is apparent that as the shapes of dies required are so simple that the dies required are relatively inexpensive and the stamping-extrusion method employed in their manufacture, a relatively simple operation.

These and such other objects of my invention as may hereinafter appear will be best understood from a description of the accompanying drawings, which illustrate various embodiments thereof.

In the drawings.

In the drawings, wherein like characters of reference indicate like parts throughout, 20 generally indicates a screw constructed in accordance with my invention.

Figure 1:
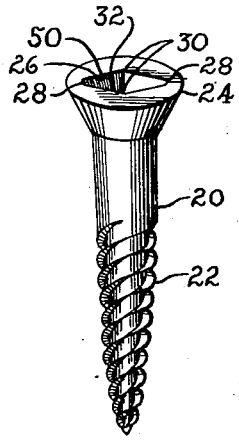
Fig. 1 is a perspective view of one embodiment of screw constructed in accordance with my invention.
Figure 5:
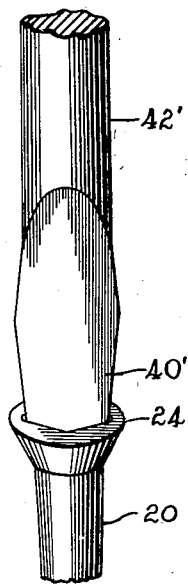
Fig. 5 is a perspective view alternatively showing an improved screw driver having a stem having a flat lower end inserted within my improved diamond shaped screw head recess for turning purposes.
Figure 2:
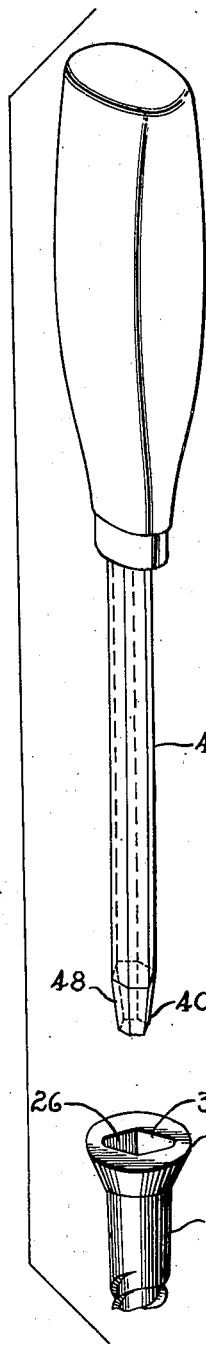
Fig. 2 is a diagrammatic perspective view illustrating a screw driver constructed in accordance with my invention having a hexagonal head about to be inserted within the recessed head of a screw constructed in accordance with my invention.
Figure 3:
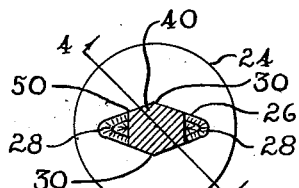
Fig. 3 is a plan view of my improved screw showing my improved screw driver in cross section.
Figure 4:
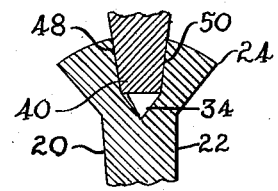
Fig. 4 is a vertical sectional view taken along the line 4—4 of Fig. 3.
Figure 6:
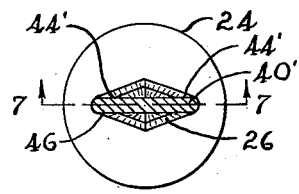
Fig. 6 is a plan view similar to Fig. 3 of my improved screw showing, however, in section a flat screw driver inserted in the diamond shaped recess thereof.
Figure 7:
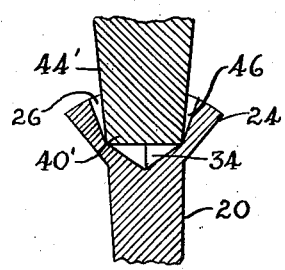
Fig. 7 is a vertical sectional view taken along the line 7—7 of Fig. 6.
Figure 8:
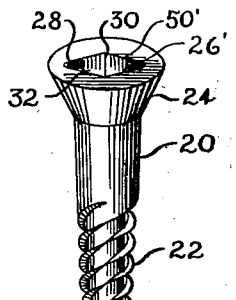
Fig. 8 is a perspective view of a different embodiment of my invention having a diamond shaped upper portion and a hexagonally shaped lower portion.
Figure 12:
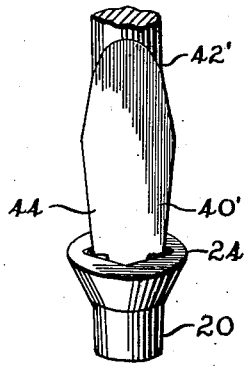
Fig. 12 is a perspective view alternatively showing a screw driver having a stem having a flat lower end inserted within my improved diamond shaped screw head recess for turning purposes of the embodiment of my invention shown in Fig. 8.
Figure 15:
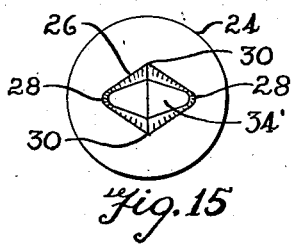
Fig. 15 is a plan view of a screw having a diamond shaped recess in the head thereof with the lower portion thereof being of different construction than that of the preferred embodiment shown in Figs. 1–7.
Figure 16:
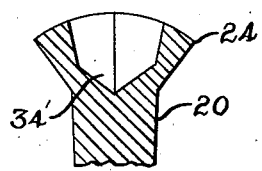
Fig. 16 is a vertical sectional view of the embodiment of my invention shown in Fig. 15.
Figure 9:
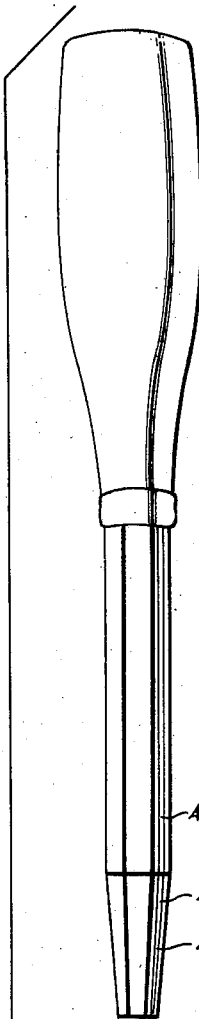
Fig. 9 is a diagrammatic perspective view illustrating a screw driver constructed in accordance with my invention having a hexagonal head about to be inserted within the recessed head of the embodiment of screw shown in Fig. 8.
Figure 10:
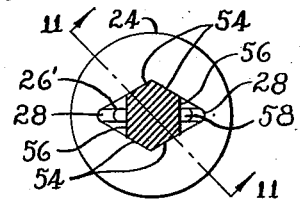
Fig. 10 is a plan view of the embodiment of screw shown in Fig. 8 showing my improved screw driver in cross section.
Figure 11:
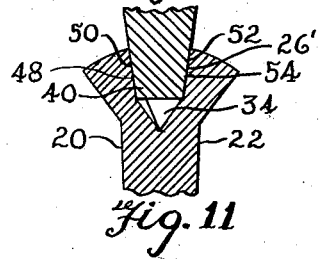
Fig. 11 is a vertical sectional view taken along the line 11—11 of Fig. 10.
Figure 13:
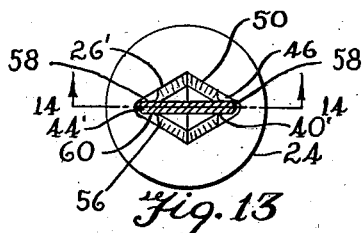
Fig. 13 is a plan view similar to Fig. 10 of the embodiment of screw shown in Fig. 8, showing however, in section a flat screw driver inserted in the diamond shaped recess thereof.
Figure 14:
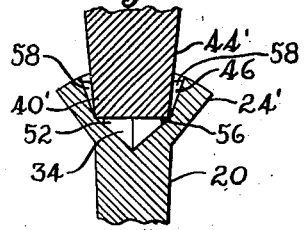
Fig. 14 is a vertical sectional view taken along the line 14—14 of Fig. 13.

Said screw 20 is provided with the usual stem 22 which may be suitably threaded, or of other torque forming shape and a head 24. In all embodiments shown the head 24 is provided with the diamond shaped recess 26 centrally thereof and in my preferred embodiment, said recess 26, preferably extends within said head substantially to and in the axial line of said stem 22 as shown in Figs. 4 and 7. The upper end of said recess is preferably of diamond shape, which shape may extend for a substantial distance within said head as in the embodiment of my invention shown in Figs. 1-7 and 15 and 16, or for only a slight distance as in the embodiment of my invention shown in Figs. 8-14. A diamond shape comprises the oppositely disposed acute angles 28 at the end portions thereof and the obtuse angles 30 centrally thereof, forming between them the side walls 32 of said diamond shaped recess. The side walls of the diamond shaped recess may taper downwardly. As shown, the lower end 34 of said recess may be of pyramidal shape, as shown in Figs. 4 and 7, 11 and 14, or may take the generally triangular shape 34' shown in Figs. 15 and 16, the shape of the diamond shaped recess 26 being immaterial below the lowest desired point of penetration of the lower end 40 of the screw driver 42. If desired, the acute angles 28 may be somewhat rounded off or truncated as shown.

It is thus obvious that a flat screw driver 42' as shown in Figs. 5, 7 and 12-14 having a flat lower end 40' having downwardly tapered end walls may be inserted within said recess 26 to have the side walls 44' thereof abut the side walls of the recess 26 adjacent the acute angle end portions thereof for turning purposes. Alternately, may a screw driver 42 having a hexagonal tip 40 of cooperating shape having side walls 48 preferably downwardly tapered, as shown, be inserted within said recess to have four of the side walls 48 thereof abut portions of the four side walls 50 of said diamond shaped recess for turning purposes.

It is apparent therefore, that I have provided a type of recess which may be readily stamped in a stamping or punching operation, the metal readily extruding or flowing to the desired shape.

It is also apparent that I have provided a screw having a recess shaped to receive the tip of a standard type of flat screw driver or alternatively the multisided tip of a multisided screw driver, depending particularly on whether power driving of the screw is desired.

I have shown in Figs. 8-14 an alternative embodiment of my invention which may be so similarly stamped and manufactured wherein the recess 26' located centrally thereof has a diamond shaped upper portion only, extending downwardly for a relatively short distance only, and a concentric hexagonally shaped lower portion 52. In this embodiment four of said lower portion side walls 54 are continuations of portions of the side walls 50' of said diamond shaped upper portion and the other two walls 56 are located in front of the acute angle portions 28 of said diamond shaped upper portion. Said two last-mentioned side walls 56 are each provided with a longitudinal slit 58 therein aligned with the respective slit in the opposite wall for receiving the end portion of a flat screw driver, whereby the lower end of a flat screw driver may be inserted within said slits 58 so that the side walls 44' thereof may abut the side walls 60 of said slits for turning purposes or a screw driver having a tip of cooperating hexagonal shape may be inserted within said hexagonally shaped lower portion 54 for turning purposes, for mechanically operated screw driving. If desired the upper diamond shaped portion 26' of the recess may be omitted from this embodiment.

It is apparent that I have provided a novel type of screw which may be readily driven by a standard type of flat screw driver or a multisided screw driver, which may be simply and cheaply manufactured and a novel type of cooperating screw driver with the advantages described above.

It is understood that my invention is not limited to the specific embodiments shown and that various deviations may be made therefrom without departing from the spirit and scope of the appended claims.

What I claim is:

1. A screw having a stem and a head having a diamond shaped recess therein centrally thereof truncated at each acute angle end thereof extending within said head substantially to and in the axial line of said stem and having side walls, whereby a flat screw driver may be inserted within said recess to have the side walls thereof abut the side walls of said recess adjacent the acute angle end portions thereof for turning purposes, or a screw driver having a hexagonal tip of cooperating shape may be inserted within said recess to have four walls thereof abut portions of the side walls of said diamond shaped recess for turning purposes.

2. A screw having a stem and a head having a recess centrally thereof having a diamond shaped upper portion truncated at each acute angle end thereof having downwardly tapered side walls, and a concentric hexagonally shaped lower portion having downwardly tapered side walls, four of the side walls of said lower portion being continuations of portions of the downwardly inclined side walls of said diamond shaped upper portion and the other two walls thereof being located in front of the acute angle portions of said diamond shaped upper portion, said two last-mentioned side walls each having a longitudinal slit therein aligned with the respective slit in the opposite wall having tapered ends for receiving the end portions of a flat screw driver, whereby either a flat screw driver having tapered ends may have the tip thereof inserted within said slits so that the side walls thereof may abut the side walls of said slits for turning purposes, or a screw driver having a tip of cooperating hexagonal shape having downwardly tapered side walls may be inserted within said hexagonally shaped lower portion for turning purposes.

3. A screw having a stem and a head having a recess having a diamond shaped upper portion truncated at each acute angle end thereof and a concentric hexagonally shaped lower portion and having side walls, four of the side walls of said lower portion being continuations of the side walls of said diamond shaped upper portion and the other two walls thereof being located in front of the acute angle portions of said diamond shaped upper portion, said last-mentioned side walls each having a longitudinal slit therein aligned with the respective slit in the opposite wall for receiving the tip of a flat screw driver, whereby either a flat screw driver may have the ends thereof inserted within said slits so that the side walls thereof may abut the side walls of said slits for turning purposes, or a screw driver having a tip of cooperating hexagonal shape may be inserted within said hexagonally shaped lower portion for turning purposes.

WILLIAM A. DE VELLIER.